United States Patent [19]

Blatt

[11] Patent Number: 4,809,991
[45] Date of Patent: Mar. 7, 1989

[54] HIGH-PRESSURE RESISTANT PISTON SEAL

[76] Inventor: John A. Blatt, 31915 Groesbeck Hwy., Fraser, Mich. 48026

[21] Appl. No.: 165,155

[22] Filed: Mar. 7, 1988

[51] Int. Cl.$^4$ ............................................. F16J 9/00
[52] U.S. Cl. .................................. 277/58; 277/188 R
[58] Field of Search ........... 277/58, 59, 188 A, 188 R; 123/193 P; 92/172, 192, 248, 259, 250

[56] References Cited

U.S. PATENT DOCUMENTS

| | | | |
|---|---|---|---|
| 3,393,917 | 7/1968 | Kendall et al. | 277/188 R |
| 4,470,388 | 9/1984 | Showalter | 123/193 P |
| 4,669,369 | 6/1987 | Holt et al. | 123/193 P |

Primary Examiner—William A. Cuchlinski, Jr.
Assistant Examiner—Petar Arsenovic
Attorney, Agent, or Firm—Basile and Hanlon

[57] ABSTRACT

A piston seal includes a pair of annular metal sealing rings mounted in grooves in the cylindrical surface of a piston with one ring being located adjacent each of the opposed end faces of the piston. An annular sealing member of resilient material is mounted on the piston in an annular goove located between the metal rings.

1 Claim, 1 Drawing Sheet

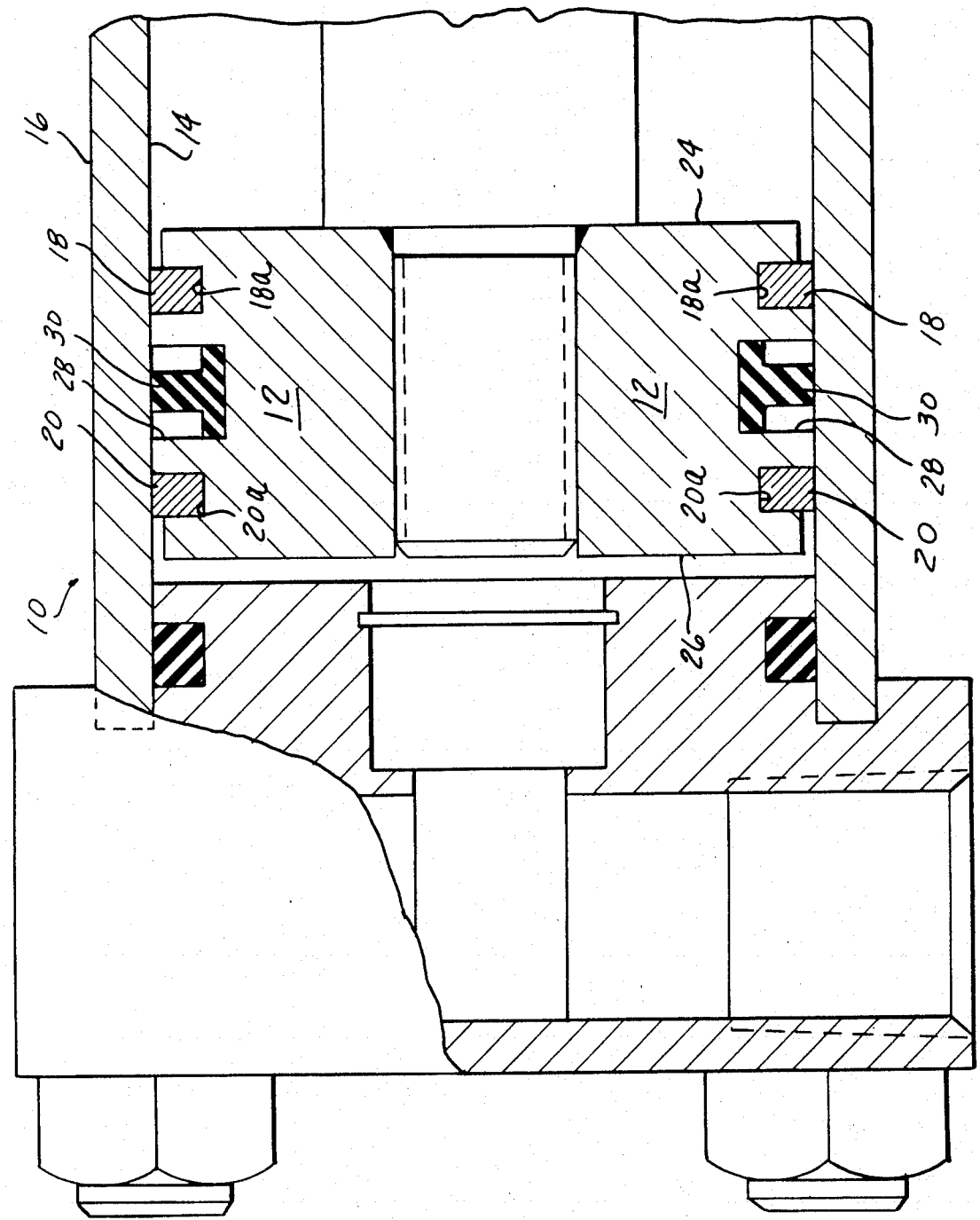

HIGH-PRESSURE RESISTANT PISTON SEAL

BACKGROUND OF THE INVENTION

The present invention is concerned with seals employed to seal the piston of a hydraulic motor to the wall of a cylinder bore in applications where high working pressures or pressure surges may be encountered.

In the past, designers of piston seals held different opinions as to whether metal piston rings or seals of resilient material provided the better seal. Advocates of the resilient seal contended that metal piston rings, due to minor imperfections in the cylinder bore and wear of the relatively soft metal ring, would inevitably permit some fluid bypass. Those who preferred the metal ring contended the resilient seal, because of its resilience, could not always successfully resist shock loading or abnormally high-pressure surges. For applications where normally encountered working pressures would be high, the standard approach was to simply increase the number of metal rings or resilient seals employed.

The present invention is directed to a piston seal arrangement which, with a minimum number of seals, is extremely resistant to fluid bypass occasioned by cylinder bore imperfections or wear of the seal and is, at the same time, substantially insensitive to high-pressure surges. The seal is especially designed for use in applications where extremely high working pressures are encountered.

SUMMARY OF THE INVENTION

In accordance with the present invention, the cylindrical surface of a piston is formed with three axially spaced annular grooves. Metal piston rings are seated or cast into the two grooves adjacent the opposite ends of the piston, and a sealing ring of resilient material is seated in the third or middle of the three grooves.

When operatively mounted within a cylinder bore, the metal rings in the two outer grooves effectively shield the resilient seal from surges of high pressure, while the resilient seal between the two metal rings effectively prevents bypassing of the piston by the small amount of fluid which may, due to minor imperfections in the cylinder bore or wear of the metal rings, leak past one of the rings.

Other objects and features of the invention will become apparent by reference to the following specification and to the drawings.

BRIEF DESCRIPTION OF THE DRAWINGS

The single FIGURE of the drawings is a partial cross-sectional view of a piston-cylinder assembly employing a seal of the present invention.

DESCRIPTION OF THE PREFERRED EMBODIMENT

In the drawings there is shown a portion only of a hydraulic motor designated generally 10 which, apart from structure employed to slidably seal the cylindrical surface of the piston 12 to the wall of cylinder bore 14 of cylinder 16, is of conventional and well-known construction.

The sealing structure which embodies the present invention includes a pair of annular metal piston rings which are seated or cast in place in respective annular grooves 18a, 20a located in adjacent, inwardly spaced relationship to the opposed end faces 24, 26 respectively of piston 12. The radially outer surfaces of rings 18 and 20 are formed and dimensioned to slidably engage the wall of cylinder bore 14 to dimensional tolerances well known and established in the art.

A third annular groove 28 is formed in the cylindrical surface of piston 12 between grooves 18a and 20a to receive an annular seal member 30 of resilient material, which in the embodiment illustrated in the drawing is of T-shaped cross section. Many synthetic materials having properties well adapted to the requirements of a resilient seal are commercially available, one such material being marketed under the trademark VITON. The sealing member 30 is so dimensioned that it will be readily compressed between the cylinder bore and the bottom of groove 28 when the piston is in place within cylinder 16. The seals 30 are dimensioned by their manufacturers to fit, with the proper radial compression, standardized cylinder bore-piston groove dimensions.

The sealing arrangement disclosed and described above provides a substantially improved sealing integrity as compared to prior art seal configuration. The metal rings 18, 20 at each end of the piston shield the resilient sealing member 30 from surges of abnormally high pressure, while leakage of fluid past either metal ring 18 or 20, as might result from minor imperfections in cylinder bore 14 and/or wear of the sealing surfaces of rings 18 and 20, is prevented from entirely bypassing piston 12 by the centrally located resilient seal 30.

While one embodiment of the invention has been described in detail, it will be apparent to those skilled in the art the disclosed embodiment may be modified. Therefore, the foregoing description is to be considered exemplary rather than limiting, and the true scope of the invention is that defined in the following claims.

What is claimed is:

1. In a piston-cylinder assembly including a cylindrical piston coaxially slidably received in a cylinder bore and seal means slidably sealing the cylindrical surface of said piston to the wall of said cylinder bore;

the improvement wherein said seal means comprises means defining a first pair of spaced annular grooves in said cylindrical surface of said piston respectively located adjacent the opposite ends of said surface, means defining a second annular groove in said surface located between and spaced from each of said first grooves, a pair of annular metal sealing rings respectively mounted in said first pair of grooves, and an annular sealing member of resilient material, having a T-shaped cross-sectional configuration, seated in said second annular groove, said rings and sealing member being adapted to slidably and sealingly engage the wall of said cylinder bore.

* * * * *